United States Patent Office 3,734,949
Patented May 22, 1973

3,734,949
CARBAMATES OF NORBORNANES
Harvey E. Alburn, West Chester, and William Dvonch, Radnor, Pa., assignors to American Home Products Corporation, New York, N.Y.
No Drawing. Continuation-in-part of application Ser. No. 644,089, June 7, 1967. This application June 3, 1970, Ser. No. 43,207
Int. Cl. C07c 125/04
U.S. Cl. 260—482 B    2 Claims

ABSTRACT OF THE DISCLOSURE

Carbamic acid esters of 2-norbornanol, 5-norbornene-2,3-dimethanol, and related compounds exhibit antiviral activity.

CROSS REFERENCE TO RELATED APPLICATION

This application is a continuation-in-part of Ser. No. 644,089, filed June 7, 1967, now abandoned.

BACKGROUND OF THE INVENTION

This invention relates to compositions of matter classified in the art of chemistry as carbamic acid esters of norbornane derivatives, which exhibit antiviral activity in standard pharmacological tests.

SUMMARY OF THE INVENTION

The invention sought to be patentded as a composition of matter resides in the concept of a chemical compound selected from the group represented by Formula I:

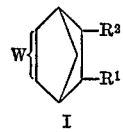

I wherein $R^1$ is hydrogen, carbamoyloxy or carbamoyloxymehyl; $R^2$ is carbamoyloxymethyl or carbamoyloxy; and W represents a double bond or single bond, provided that when W represents a double bond and $R^1$ is hydrogen, $R^2$ must be carbamoyloxymethyl; and that when $R^1$ is a group other than hydrogen, $R^1$ and $R^2$ are similar.

The tangible embodiments of the compositions of matter possess the inherent general physical properties of being high melting, white crystalline solids; are substantially insoluble in water; are soluble in polar solvents such as dimethysulfoxide and dimethylformamide. Examination of compounds produced according to the hereinafter described process reveals, upon infrared spectrographic analysis, spectral data confirming the molecular structure hereinbefore set forth. For example, the C=O frequency characteristic of a carbamate ester is evident. The aforementioned physical characteristics, taken together with the nature of the starting materials and the modes of synthesis, positively confirm the structure of the compositions sought to be patented.

The tangible embodiments of the compositions possess the inherent applied use characteristics of exerting antiviral activity in mice infected wth Columbia SK polio virus. The antiviral activity is elicited by following the test procedure described by C.P. Hegarty et al. on pp. 469 and 470 in an article published in "Annals of the New York Academy of Science," 131, 469 (1965). The compounds produce a significant increase in mean survival time of mice infected with Columbia SK polio virus at a dose of 0.3 mg. per kilogram of body weight.

The manner of making the invention will now be generally described so as to enable a person skilled in the art of chemistry to make a specific embodiment of the same as follows:

DESCRIPTION OF PREFERRED EMBODIMENTS

The carbamic acid esters (IV) of the present invention are prepared by a two-step process which involves first treating an alcohol (II) with phosgene in an inert organic solvent, preferably benzene, at a temperature of from about 25° to 35° to afford an acid chloride ester (III), and then reacting the acid chloride ester with ammonia in an inert organic solvent at 0° to 10°. These reactions are illustrated as follows:

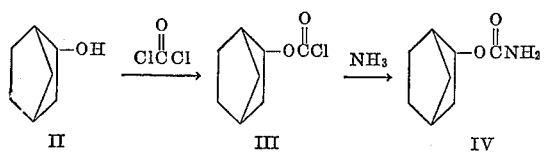

II            III           IV

The dicarbamates (VI) can be prepared in a similar manner from a dialcohol (V) using stoichiometrically equivalent amounts of phosgene and ammonia, as illustrated below:

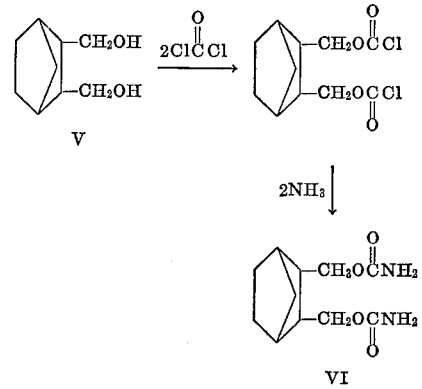

VI

It will be apparent to one skilled in the art of chemistry that derivatives of norbornane can exist in isomeric forms depending upon the spatial relationship of the ring substituents relative to the bicycloheptane nucleus. Such forms, designated as endo and exo, are fully equivalent for purposes of the invention hereinbefore disclosed.

The best mode contemplated by the inventors of carrying out their invention will now be set forth as follows:

EXAMPLE 1

2-norbornanol, carbamate

A solution of 0.225 mole of phosgene in benzene (179 ml. of a 12.5% solution, 22.3 g.) is added dropwise to a stirred solution of 16.8 g. exo-norbornanol (0.15 mole) in 300 ml. of benzene with maintenance of the temperature 30°±5°. The solution is stirred for another hour, aerated with nitrogen for 4 hours, concentrated to an oil in vacuo, and made up to the original volume with benzene. Ammonia gas is then passed into the reaction mixture for 18 hours at <10°, and the mixture is left to stand overnight to lose ammonia. The precipitated ammonium chloride is filtered off, and the filtrate concenerated to a gelatinous mass which is centrifuged to yield 7.4 g. of exo-2-norbornanol, carbamate (32% yield) after drying on a clay block in vacuo over silica gel, M.P. 91–94°.

Analysis for $C_8H_{13}NO_2$.—Calculated (percent): C, 61.92; H, 8.44; N, 9.02. Found (percent): C, 61.88; H, 8.19; N, 8.73.

EXAMPLE 2

2-norbornanemethanol, carbamate

Following the procedure of Example 1, but substituting an equivalent amount of 2-norbornanemethanol for 2-norbornanol, there is obtained the title compound.

EXAMPLE 3

5-norbornene-2,3-dimethanol, dicarbamate

A solution of 0.450 mole of phosgene in benzene is added dropwise to a stirred solution of 0.15 mole of 5-norbornene-2,3-dimethanol in 300 ml. of benzene with maintenance of the temperature at 30°±5°. The solution is stirred for an additional hour, aerated with nitrogen for 4 hours, concentrated in vacuo, and then benzene is added to return it to the original volume. Ammonia gas is then passed into the reaction mixture for 8 hours at <10°, and the mixture is permitted to stand overnight. The precipitate formed is washed with water and the residue is recrystallized from acetone to yield 18% of 5-norbornene-2,3-dimethanol, dicarbamate, M.P. 130–136°.

*Analysis* for $C_{11}H_{16}N_2O_4$.—Calculated (percent): C, 55.0; H, 6.7; N, 11.7. Found (percent): C, 55.4; H, 6.7; N, 10.7.

EXAMPLE 4

2,3-norbornanedimethanol, carbamate

Following the procedure of Example 3, but substituting an equivalent amount of 2,3-norbornanedimethanol for 5-norbornene-2,3-dimethanol, there is obtained the title compound.

EXAMPLE 5

5-norbornene-2,3-diol, dicarbamate

Following the procedure of Example 3, but substituting an equivalent amount of 5-norbornene-2,3-diol for 5-norbornene-2,3-dimethanol, there is obtained the title product.

EXAMPLE 6

Norbornane-2,3-diol, dicarbamate

Following the procedure of Example 3, but substituting an equivalent amount of norbornane-2,3-diol for 5-norbornene-2,3-dimethanol, there is obtained the title compound.

All temperatures expressed herein are in centigrade.

The subject matter which the applicants regard as their invention is particularly pointed out and distinctly claimed as follows:

1. 2-norbornanol, carbamate.
2. 5-norbornene-2,3-dimethanol, dicarbamate.

References Cited

UNITED STATES PATENTS

| | | | |
|---|---|---|---|
| 2,846,465 | 8/1958 | Boehme et al. | 260—482 |
| 3,418,362 | 12/1968 | Goonewardene, et al. | 260—482 |
| 2,841,485 | 12/1958 | Johnson, et al. | 260—482 X |

FOREIGN PATENTS

| | | | |
|---|---|---|---|
| 192,795 | 10/1967 | U.S.S.R. | 260—482 |

LORRAINE A. WEINBERGER, Primary Examiner

P. J. KILLOS, Assistant Examiner

U.S. Cl. X.R.

260—463, 482 C; 424—299